US012681125B2

(12) United States Patent
Wahl

(10) Patent No.: US 12,681,125 B2
(45) Date of Patent: Jul. 14, 2026

(54) UWB LOCATING SYSTEM HAVING A DATA NETWORK CONNECTION COMPONENT TRANSMITTING IN PARALLEL

(71) Applicant: TRUMPF Tracking Technologies GmbH, Ditzingen (DE)

(72) Inventor: Eberhard Wahl, Weilheim an der Teck (DE)

(73) Assignee: TRUMPF TRACKING TECHNOLOGIES GMBH, Ditzingen (DE)

( * ) Notice: Subject to any disclaimer, the term of this patent is extended or adjusted under 35 U.S.C. 154(b) by 242 days.

(21) Appl. No.: 18/336,056

(22) Filed: Jun. 16, 2023

(65) Prior Publication Data

US 2023/0333195 A1     Oct. 19, 2023

Related U.S. Application Data

(63) Continuation of application No. PCT/EP2021/085489, filed on Dec. 13, 2021.

(30) Foreign Application Priority Data

Dec. 17, 2020    (DE) ..................... 10 2020 216 166.6

(51) Int. Cl.
*G01S 5/00*        (2006.01)
*G01S 5/02*        (2010.01)

(52) U.S. Cl.
CPC ........ *G01S 5/0081* (2013.01); *G01S 5/02213* (2020.05)

(58) Field of Classification Search
CPC ........ G01S 5/14; G01S 5/0081; G01S 5/0259; G01S 5/02213–02216
See application file for complete search history.

(56) References Cited

U.S. PATENT DOCUMENTS

| | | | | |
|---|---|---|---|---|
| 10,942,250 | B2 * | 3/2021 | Bartov | ................. G01S 13/878 |
| 11,470,571 | B2 * | 10/2022 | Henry | ...................... H04B 1/69 |
| 12,225,496 | B2 * | 2/2025 | Laine | ................... G01C 21/206 |
| 2003/0097482 | A1 * | 5/2003 | DeHart | ................... H04L 61/00 |
| | | | | 709/253 |
| 2016/0100289 | A1 | 4/2016 | Mayorchik et al. | |

(Continued)

FOREIGN PATENT DOCUMENTS

| | | | |
|---|---|---|---|
| WO | WO 2017005502 A1 | 1/2017 | |
| WO | WO 2020212722 A1 | 10/2020 | |
| WO | WO 2020212723 A1 | 10/2020 | |

OTHER PUBLICATIONS

Käfer Simone, "So funktioniert Omlox," 14. Aug. 2020, pp. 1-5, Retrieved from the Internet on May 10, 2023: URL:https://www.maschinenmarkt.vogel.de/so-funktioniert-onlox-a-955212.

(Continued)

*Primary Examiner* — Cassi J Galt

(74) *Attorney, Agent, or Firm* — LEYDIG, VOIT & MAYER, LTD.

(57)        ABSTRACT

A locating system determines the position of an object with an ultra-wideband mobile unit. The locating system includes UWB anchors configured to locate the object; and a communication radio network having a data network connection component. The data network connection component is configured for parallel transmission of data streams of the UWB anchors.

11 Claims, 2 Drawing Sheets

(56) References Cited

U.S. PATENT DOCUMENTS

| | | | |
|---|---|---|---|
| 2016/0349353 A1* | 12/2016 | Wang | G01S 5/02213 |
| 2017/0128814 A1 | 5/2017 | Ianni et al. | |
| 2019/0200383 A1 | 6/2019 | Jiang et al. | |
| 2019/0263432 A1 | 8/2019 | Carlson et al. | |
| 2020/0096600 A1* | 3/2020 | Fortney | H04W 12/02 |
| 2022/0210620 A1* | 6/2022 | Wahl | H04B 7/2678 |

OTHER PUBLICATIONS

Lancom Systems Gmbh, "Der neue WLAN-Standard WiFi 6," LANCOM Whitepaper, Sep. 2020, pp. 1-8, LANCOM Systems GmbH, Wuerselen, Germany Retrieved online: https://www.lancom-systems.de/downloaded/whitepapter/WP_Wi-Fi-6_DE.pdf.

* cited by examiner

UWB LOCATING SYSTEM HAVING A DATA NETWORK CONNECTION COMPONENT TRANSMITTING IN PARALLEL

CROSS REFERENCE TO RELATED APPLICATIONS

This application is a continuation of International Application No. PCT/EP2021/085489 (WO 2022/128916 A1), filed on Dec. 13, 2021, and claims benefit to German Patent Application No. DE 10 2020 216 166.6, filed on Dec. 17, 2020. The aforementioned applications are hereby incorporated by reference herein.

FIELD

The present disclosure relates to a locating system for locating an object. The present disclosure furthermore relates to a method for locating an object.

BACKGROUND

The position of an object can be determined using a locating system based on ultra-wideband (UWB) technology. The object in this case has a UWB mobile unit, the position of which is able to be ascertained in particular by determining the time of flight of signals to multiple UWB anchors.

However, during the position determination, large amounts of data accrue at the UWB anchors. One problem with the known locating systems is, thus, the high installation outlay for the reliable transmission of the amounts of data of the UWB anchors.

There are also designs in which the anchors are connected via a dedicated radio communication system. Although these installations reduce the installation costs of the UWB locating system, they lead to interference with existing radio communication services (CCI=co-channel interference and ACI=adjacent channel-interference) and are therefore undesirable.

SUMMARY

In an embodiment, the present disclosure provides a locating system that determines the position of an object with an ultra-wideband mobile unit. The locating system includes UWB anchors configured to locate the object; and a communication radio network having a data network connection component. The data network connection component is configured for parallel transmission of data streams of the UWB anchors.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
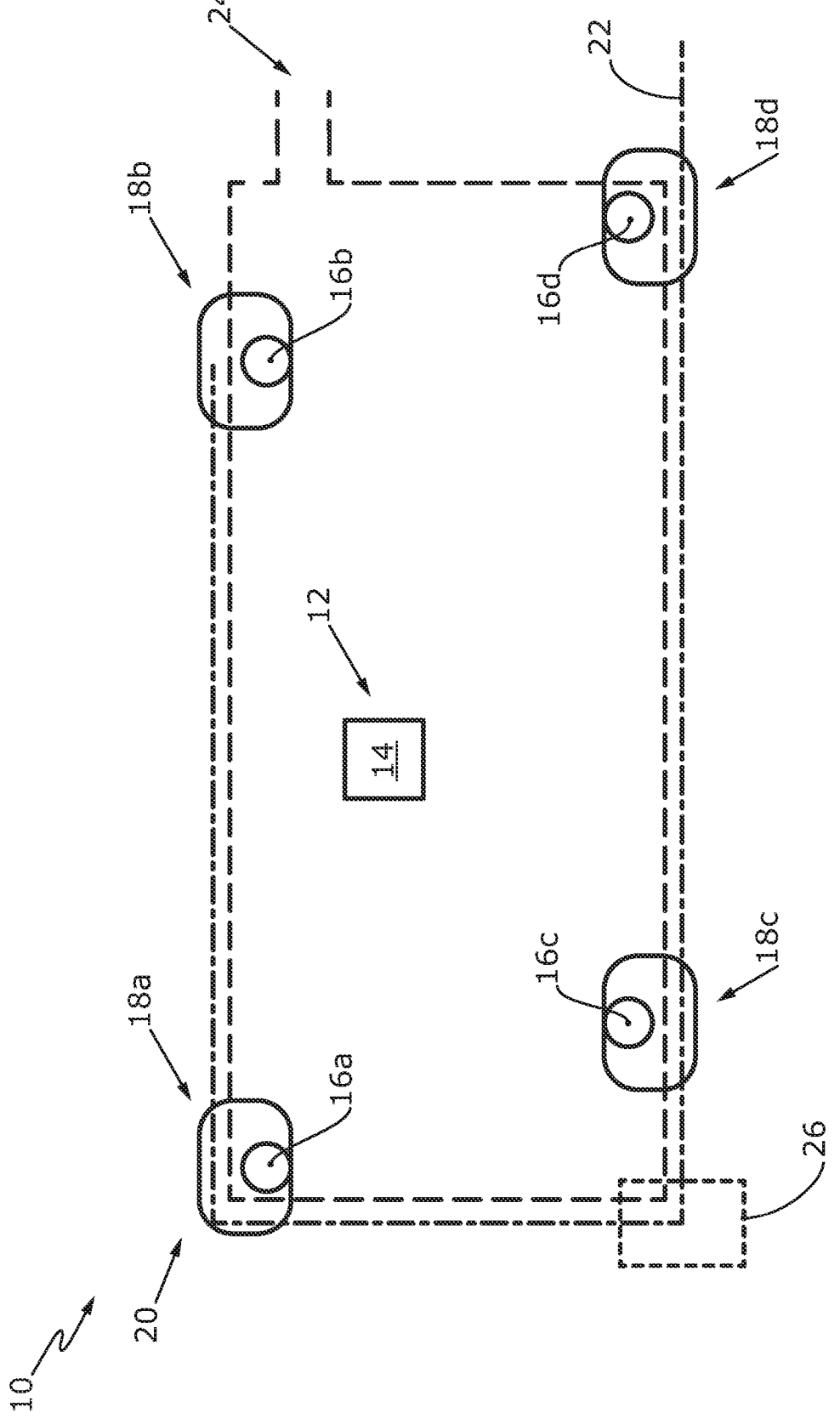
FIG. 1 schematically shows a first embodiment of a locating system and of a method for locating an object.

Aspects of the present disclosure provide a locating system for determining the position of an object, which locating system is significantly easier to install. Aspects of the present disclosure also provide a method for locating an object, which method is able to be carried out with low installation outlay and preferably does not interfere with the pure radio communication network.

An aspect of the present disclosure provides a locating system for determining the position of an object with a UWB mobile unit (also called "tag" or "tag device"). The locating system has multiple UWB anchors (also called "beacons") for locating the object. The locating system furthermore uses a communication radio network with at least one data network connection component that is designed for the parallel transmission of data streams of the UWB anchors.

The parallel data stream transmission of the UWB anchors makes it possible to dispense with installation outlay for the UWB anchors, in particular in terms of data cabling. The installation and potential upgrading of the locating system are significantly simplified. It is additionally possible to place the UWB anchors in a more flexible manner. Since there is no competing communication radio network, no interference takes place either and the data streams are able to be managed efficiently.

The structure, the locating and/or communication and/or the data protocols on the UWB channel may be implemented in particular according to the description in WO 2020/212722 A1, which is incorporated entirely into this application by reference. WO 2020/212722 A1, entitled "Ultra-Wideband Location Systems and Methods", was applied for on Apr. 19, 2019, and published on 10.22.2020.

The communication radio network preferably has multiple connected data network connection components. The UWB anchors are preferably designed as Omlox anchors. The object may be part of the locating system.

Omlox is an open standard for a precise real-time localization system for indoor spaces. Omlox defines open interfaces for an interoperable localization system. Omlox allows different sectors to use a single infrastructure with different applications from different providers. Since the same infrastructure is used, the overall operating costs are lowered, which allows simple integration of different applications. A key feature of Omlox is that it enables a cyberphysical simplification and combines the integration of industrial software and hardware solutions into a shared ecosystem.

Omlox-based anchors make it possible to integrate different types of software, such as a Manufacturing Executive System (MES), Asset Tracking and Navigation with Anti-collision and hardware such as drones, automated guided vehicles (AGVs) and loading vehicles into the field of localization.

Omlox enables interoperability and flexibility for different trackable providers within one or more tracking zones. Omlox does this using two core components: Omlox hub and Omlox core zone. The Omlox hub enables interoperability and flexibility within different tracking zones, while the Omlox core zone offers interoperability and flexibility within a single tracking zone.

The Omlox hub enables interoperability and flexibility over different complementary zones. In addition to UWB, other locating technologies, such as RFID, 5G, BLE, Wi-Fi and GPS, are also used in production, supply and storage. Omlox makes it possible to ensure that networks operate in a frictionless and interoperable manner. Businesses are thereby easily able to network applications such as production control systems, installation tracking and navigation across different location zones.

The Omlox hub is compatible with multiple tracking zones. Smart factories, which operate with a UWB localization zone, a truck loading area with GPS positioning and a warehouse with Wi-Fi positioning, are able to be monitored efficiently using the Omlox hub. The Omlox hub makes it possible to transmit, synchronize and orient maps of discrete local coordinates (association of simultaneous location and mapping (SLAM) and other techniques) to give global geographical coordinates of the entire smart factory.

The Omlox core zone cooperates with open interfaces and guarantees interoperability in the ultra-wideband (UWB) range. UWB is a radio standard that is used over short distances and for locating purposes in factories. Ultra-wideband is particularly robust and guarantees precise locating of materials, orders and navigation of AGV and drones—even in the event of obstacles such as metal reflections. Omlox creates an interoperable infrastructure that operates by plug-and-play. Businesses are able to network all UWB products quickly and easily independently of the manufacturer using the Omlox standard.

The properties of Omlox anchors are described in more detail in the Omlox specification, published at <<//omlox-.com>>.

In one preferred embodiment of the present disclosure, a UWB anchor is arranged or formed on or in a data network connection component. This compact design of the data network connection component or of the UWB anchor further simplifies the installation of the locating system. The data network connection component and the UWB anchor may be arranged in a shared housing. As an alternative or in addition thereto, the data network connection component and the UWB anchor may have a shared voltage supply.

More preferably, multiple UWB anchors, in particular all UWB anchors, are each arranged or formed on or in a data network connection component.

In one particularly preferred embodiment of the locating system, the data network connection component is designed to reserve a separate bandwidth exclusively for the data communication of the attached UWB anchors in order to transmit data streams by multi-user-multiple-input-and-multiple-output (MU-MIMO) and/or by orthogonal-frequency-division-multiple-access (OFDMA). This data connection thereby takes place without resource conflict with other users of the communication radio network.

Several, in particular all, data network connection components are preferably designed to transmit data streams by MU-MIMO and/or OFDMA.

The one or more data network connection components may be designed as Wi-Fi 6 gateways. The communication radio network is based here on the 802.11ax standard. Wi-Fi 6 is able to manage competing data streams and in so doing assign bandwidths in a specific manner. In this case, Wi-Fi channels are divided into what are known as "resource units".

The one or more data network connection components may be connected to the communication radio network by Ethernet. As an alternative or in addition thereto, the one or more data network connection components may be connected by optical fibers and/or mobile radio, in particular by the 5G standard.

The locating system may have a server, which is connected in particular to the Ethernet and which has UWB software and/or a UWB hub. The server may be maintained in remote mode, in particular via the Internet. The server is preferably designed in the form of an edge server.

In a further preferred embodiment of the present disclosure, the locating system has a UWB anchor the data of which are able to be transmitted to the communication radio network wirelessly by Wi-Fi with parallel data stream transmission. The wireless installation makes it possible to arrange the UWB anchor in a particularly simple manner. The UWB anchor accordingly requires just one voltage supply. Due to the parallel transmission of its data streams, the UWB anchor is also able to be integrated easily into the locating system without wired data transmission. More preferably, the locating system has multiple UWB anchors the data of which are able to be transmitted to the communication radio network wirelessly by Wi-Fi with parallel data stream transmission.

The installation of the locating system is further simplified when the locating system has a light with a UWB anchor integrated in the light and/or a smoke detector with a UWB anchor integrated in the smoke detector.

The locating system may have multiple lights each with a UWB anchor integrated in the lights and/or multiple smoke detectors each with a UWB anchor integrated in the smoke detectors.

Multiple UWB anchors are preferably connected to a two-wire-bus-system. The two-wire-bus-system may be designed as an actuator-sensor-interface (ASI). The two-wire-bus-system makes it possible, in particular in addition to supplying power, to transmit simple control commands such as on/off, and/or may be used to install or maintain the UWB anchors. All UWB anchors are preferably connected to a two-wire-bus-system.

Multiple UWB anchors and/or a data network connection component may have a shared voltage supply. All UWB anchors and/or all data network connection components are preferably connected via the same voltage supply.

An aspect of the present disclosure further provides a method for locating an object. The method is preferably performed using a locating system described here. The method has the following method steps:

A) determining position data of a UWB mobile unit by way of multiple UWB anchors;

B) transmitting the data streams of at least one UWB anchor, in particular multiple UWB anchors, preferably all UWB anchors, by parallel data transmission, in particular by parallel Wi-Fi, to a communication radio network with a data network connection component, in particular with multiple data network connection components.

At the same time as the transmission of the data streams of a UWB anchor, in particular multiple UWB anchors, preferably all UWB anchors, data streams independent of the locating system are preferably transmitted by the communication radio network.

More preferably, the data streams are transmitted by MU-MIMO and/or by OFDMA.

Further advantages of the present disclosure are evident from the description and the drawing. Similarly, according to the present disclosure, the features mentioned above and those yet to be explained further may be used in each case individually or together in any desired combinations. The embodiments shown and described should not be understood as an exhaustive list, but rather are of an exemplary character for outlining the present disclosure.

FIG. 1 shows a locating system 10 for determining the position of an object 12. The object 12 has an ultra-wideband (UWB) mobile unit 14. The position of the UWB mobile unit 14 is able to be determined by multiple UWB anchors 16a, 16b, 16c, 16d. The UWB anchors 16a-d are arranged in housings of data network connection components 18*a*, 18*b*, 18*c*, 18*d*. As a result of the integration of the UWB anchors 16*a-d* into the data network connection components 18*a-d*, the UWB anchors 16*a-d* are able to be installed in a particularly space-saving and simple manner.

The data network connection components 18*a-d* are pref-erably designed to transmit data streams by multi-user-multiple-input-and-multiple-output (MU-MIMO) and/or by orthogonal-frequency-division-multiple-access (OFDMA). The data network connection components 18*a-d* may in this case be designed in the form of Wi-Fi 6 gateways. The data network connection components 18*a-d* are part of a com-munication radio network 20.

The data network connection components 18*a-d* may be connected by Ethernet 22. As an alternative or in addition thereto, the data network connection components 18*a-d*, in particular together with the UWB anchors 16*a-d*, may be operated using a shared voltage supply 24.

The data network connection components 18*a-d* may be connected to a server 26, in particular in the form of an edge server. The server 26 may have UWB software and/or a UWB hub.

Figure 2:
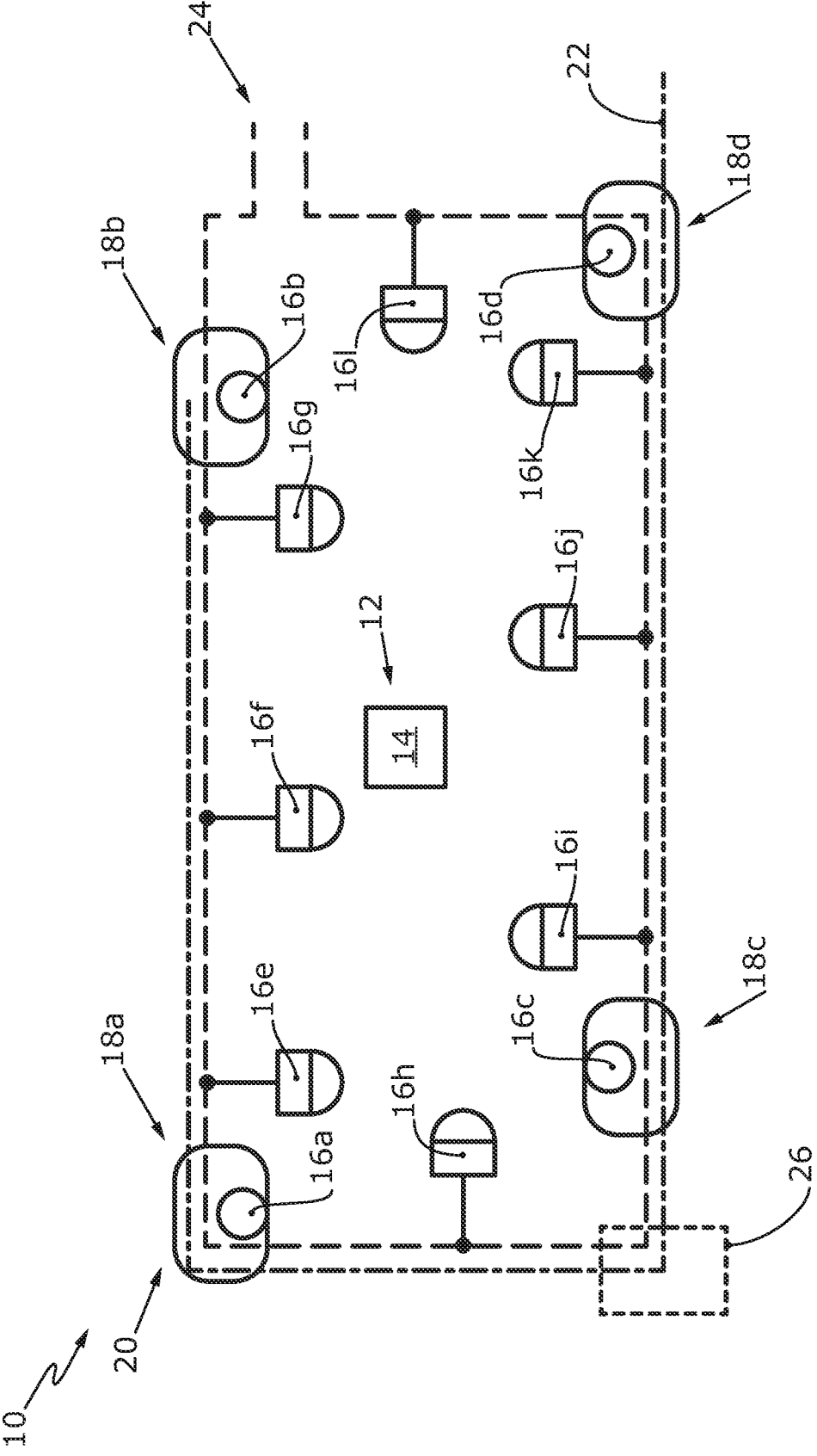
FIG. 2 schematically shows a second embodiment of a locating system and of a method for locating an object.

FIG. 2 shows a further embodiment of a locating system 10. In comparison with the locating system 10 shown in FIG. 1, the locating system 10 additionally has at least one UWB anchor 16*e*, 16*f*, 16*g*, 16*h*, 16*i*, 16*j*, 16*k*, 16l. These UWB anchors 16*e*-1 are not wired. Their data streams are trans-mitted via the communication radio network 20. This is possible in a reliable manner since the data network con-nection components 18*a-d* are designed, on the one hand, to transmit data streams to and from the UWB anchors 16*e*-1 and, at the same time, accordingly in parallel therewith, to transmit other data streams separately.

The UWB anchors 16*e*-1 are preferably connected to the voltage supply 24. The UWB anchors 16*e*-1 may be formed or arranged in lights and/or smoke detectors to further improve the integration of the locating system 10.

Viewing all the figures of the drawing together, the present disclosure relates to a locating system 10 and to a method for operating such a locating system 10. The locat-ing system 10 has a communication radio network 20 with at least one data network connection component 18*a-d*. The one or more data network connection components 18*a-d* is/are designed to transmit data streams to multiple UWB anchors 16*a*-1 by communication radio network 20 using reserved resources or bandwidths. In this case, at least some UWB anchors 16*a*-1 may be designed for wireless data stream transmission.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 Locating system
12 Object
14 UWB mobile unit
16*a*-1 UWB anchor
18*a-d* Data network connection component
20 Communication radio network
22 Ethernet
24 Voltage supply
26 Server

The invention claimed is:

1. A locating system for determining a position of an object with an ultra-wideband (UWB) mobile unit, the locating system comprising:
    a plurality of first UWB anchors configured to locate the object;
    a communication radio network comprising a plurality of data network connection components, wherein each first UWB anchor of the plurality of first UWB anchors is arranged in a respective one of the plurality of data network connection components; and
    at least one second UWB anchor;
    wherein the plurality of data network connection compo-nents is configured for parallel transmission of data streams of the plurality of first UWB anchors, and, in parallel with the transmission of the data streams of the plurality of first UWB anchors and independent of the locating system, transmitting an additional data stream of the at least one second UWB anchor, and
    wherein the plurality of UWB anchors is connected to a two-wire-bus-system, wherein the two-wire-bus sys-tem is used for transmitting on/off control commands for installation or maintenance of the plurality of UWB anchors.

2. The locating system as claimed in claim 1, wherein the communication radio network is configured to make avail-able a separate bandwidth exclusively for data communica-tion of the plurality of first UWB anchors in order to transmit the data streams by multi-user-multiple-input-and-multiple-output and/or by orthogonal-frequency-division-multiple-access.

3. The locating system as claimed in claim 1, wherein the plurality of data network connection components is con-nected to the communication radio network by Ethernet.

4. The locating system as claimed in claim 1, further comprising a server, wherein the server comprises UWB software or a UWB hub.

5. The locating system as claimed in claim 1, wherein the locating system is configured such that the data stream of at least one of the plurality of first UWB anchors is transmitted to the communication radio network wirelessly by Wi-Fi with parallel transmission.

6. The locating system as claimed in claim 5, wherein the locating system is configured such that data streams of multiple first UWB anchors of the plurality of first UWB anchors are transmitted to the communication radio network wirelessly by Wi-Fi with parallel transmission.

7. The locating system as claimed in claim 1, further comprising:
    a light, wherein the at least one second UWB anchor is integrated in the light; or
    a smoke detector, wherein the at last one second UWB anchor is integrated in the smoke detector.

8. The locating system as claimed in claim 1, wherein the at least one second UWB anchor comprises a plurality of second UWB anchors, the locating system further comprising:
    multiple lights, each light having one of the plurality of second UWB anchors integrated therein; or
    multiple smoke detectors, each smoke detector having one of the plurality of second UWB anchors integrated therein.

9. The locating system as claimed in claim 1, wherein the plurality of the first UWB anchors and/or the plurality of data network connection components have a shared voltage supply.

10. A method for locating an object, using the locating system as claimed in claim 1, the method comprising:
    determining position data of a UWB mobile unit on the object by using the plurality of first UWB anchors; and
    transmitting the data streams of the plurality of first UWB anchors by parallel transmission to the communication radio network with the plurality of data network connection components.

11. The method as claimed in claim 10, wherein the data streams are transmitted separately by multi-user-multiple-input-and-multiple-output and/or by orthogonal-frequency-division-multiple-access.

* * * * *